United States Patent
Zeng et al.

(10) Patent No.: US 10,455,862 B2
(45) Date of Patent: Oct. 29, 2019

(54) ELECTRONIC CIGARETTE WITH INTELLIGENT BATTERY MODULE

(71) Applicant: SHENZHEN CHUANGYUANTENG TECHNOLOGY CO., LTD., Shenzhen (CN)

(72) Inventors: Ruifang Zeng, Guangzhou (CN); Yufei Wang, Shenzhen (CN)

(73) Assignee: SHENZHEN CHUANGYUANTENG TECHNOLOGY CO., LTD., Shenzhen (CN)

(*) Notice: Subject to any disclaimer, the term of this patent is extended or adjusted under 35 U.S.C. 154(b) by 977 days.

(21) Appl. No.: 14/860,650

(22) Filed: Sep. 21, 2015

(65) Prior Publication Data

US 2017/0079323 A1    Mar. 23, 2017

(51) Int. Cl.

| A24F 47/00 | (2006.01) |
| H02J 7/00 | (2006.01) |
| H01M 2/10 | (2006.01) |
| H01M 10/42 | (2006.01) |
| H01M 10/48 | (2006.01) |
| H01M 2/34 | (2006.01) |
| H01M 6/50 | (2006.01) |
| H01M 2/06 | (2006.01) |

(52) U.S. Cl.
CPC ......... *A24F 47/008* (2013.01); *H01M 2/1022* (2013.01); *H01M 2/34* (2013.01); *H01M 6/505* (2013.01); *H01M 10/425* (2013.01); *H01M 10/4257* (2013.01); *H01M 10/48* (2013.01); *H01M 10/488* (2013.01); *H02J 7/0026* (2013.01); *H02J 7/0045* (2013.01); *H01M 2/06* (2013.01); *H01M 2/1055* (2013.01); *H01M 2220/30* (2013.01)

(58) Field of Classification Search
CPC ..... A24F 47/008; H02J 7/0045; H02J 7/0026; H01M 2/1022; H01M 10/4257; H01M 10/48; H01M 2/34; H01M 10/425; H01M 10/488; H01M 6/505; H01M 2/06; H01M 2220/30; H01M 2/1055
See application file for complete search history.

(56) References Cited

U.S. PATENT DOCUMENTS

| 2015/0208729 A1* | 7/2015 | Monsees | A24F 47/008 131/329 |
| 2016/0331029 A1* | 11/2016 | Contreras | A24F 47/008 |

* cited by examiner

*Primary Examiner* — Ibrahime A Abraham
*Assistant Examiner* — Biniam B Asmelash

(57) ABSTRACT

An electronic cigarette includes a cigarette housing, a cartridge received in the cigarette housing, a vaporizer, and an intelligent battery module. The intelligent battery module includes a battery casing, a battery supporting tray for accommodating at least one battery, a Printed Circuit Board (PCB) supported in the battery casing and is electrically connected to the battery supporting tray, a Main Control Unit (MCU) implemented on the PCB, and a resistance detection circuitry implemented on the PCB for detecting a resistance of the heating element. When the resistance of the heating element reaches a predetermined upper threshold, the MCU is configured to lower or cut off a voltage supplied to the heating element. When the resistance of the heating element reaches a predetermined lower threshold, the MCU is configured to supply a normal voltage to the heating element of the vaporizer.

8 Claims, 15 Drawing Sheets

ELECTRONIC CIGARETTE WITH INTELLIGENT BATTERY MODULE

BACKGROUND OF THE PRESENT INVENTION

Field of Invention

The present invention relates to an electronic cigarette, and more particularly to an electronic cigarette which comprises an intelligent battery module which is capable of preventing excessive power from being outputted to the vaporizer.

Description of Related Arts

A conventional electronic cigarette usually comprises a cigarette casing containing a predetermined amount of liquid solution, a vaporizer for controllably atomizing the liquid solution, and a battery electrically connected to the vaporizer. When a smoker inhales, it generates airflow in the cigarette casing and activates the vaporizer to atomize the liquid solution. The vapor thus produced is then inhaled by the smoker.

When a conventional electronic cigarette operates, the battery is used to drive the vaporizer to continuously atomize the liquid solution. When the electronic cigarette is operated for a certain period of time, the temperature of the battery will increase. This increase in temperature will cause the temperature of the other components of the electronic cigarette to increase as well. This overall increase in temperature may cause uncomfortable feeling to the user. In worse situations, this undesirable increase in temperature may cause damage to the other components of the electronic cigarette and lowers the general lifespan thereof.

As a result, there is a need to develop an electronic cigarette which does not produce undesirably elevated temperature when in use.

SUMMARY OF THE PRESENT INVENTION

Certain variations of the present invention provide an electronic cigarette comprising an intelligent battery module which is capable of preventing excessive power from being outputted to the vaporizer.

Certain variations of the present invention provide an electronic cigarette which comprises an intelligent battery module which is capable of detecting a resistance of a heating element of a vaporizer so as to intelligently adjust a voltage outputted to the vaporizer.

Certain variations of the present invention provide an intelligent battery module for an electronic cigarette battery, wherein the intelligent battery module is capable of preventing excessive power from being outputted to the vaporizer.

In one aspect of the present invention, it provides an electronic cigarette, comprising:

a cigarette housing;

a cartridge received in the cigarette housing for storing a predetermined amount of liquid solution;

a vaporizer received in the cigarette housing and connected to the cartridge, the vaporizer having a vaporizing chamber and comprising a heating element in the vaporizing chamber for atomizing the liquid solution; and an intelligent battery module, which comprises:

a battery casing having a connecting terminal electrically connected to the vaporizer;

a battery supporting tray received in the battery casing for accommodating at least one battery;

a Printed Circuit Board (PCB) supported in the battery casing and is electrically connected to the battery supporting tray;

a Main Control Unit (MCU) implemented on the PCB; and a resistance detection circuitry implemented on the PCB and is electrically connected to the MCU and the heating element of the vaporizer for detecting a resistance of the heating element, in such a manner that when the resistance of the heating element as detected by the resistance detection circuitry reaches a predetermined upper threshold, the MCU is configured to lower or cut off a voltage supplied to the heating element so as to prevent the temperature of the heating element from further increasing, wherein when the resistance of the heating element as detected by the resistance detection circuitry reaches a predetermined lower threshold, the MCU is configured to supply a normal voltage to the heating element of the vaporizer.

In another aspect of the present invention, it provides an intelligent battery module for an electronic cigarette having a vaporizer which has a heating element, the intelligent battery module comprising:

a battery casing having a connecting terminal electrically connected to the vaporizer;

a battery supporting tray received in said battery casing for accommodating at least one battery;

a Printed Circuit Board (PCB) supported in the battery casing and is electrically connected to the battery supporting tray;

a Main Control Unit (MCU) implemented on the PCB; and a resistance detection circuitry implemented on the PCB and is electrically connected to the MCU and the heating element of the vaporizer for detecting a resistance of the heating element, in such a manner that when the resistance of the heating element as detected by the resistance detection circuitry reaches a predetermined upper threshold, the MCU is configured to lower or cut off a voltage supplied to the heating element so as to prevent the temperature of the heating element from further increasing, wherein when the resistance of the heating element as detected by the resistance detection circuitry reaches a predetermined lower threshold, the MCU is configured to supply a normal voltage to the heating element of the vaporizer.

DETAILED DESCRIPTION OF THE PREFERRED EMBODIMENT

Figure 1:
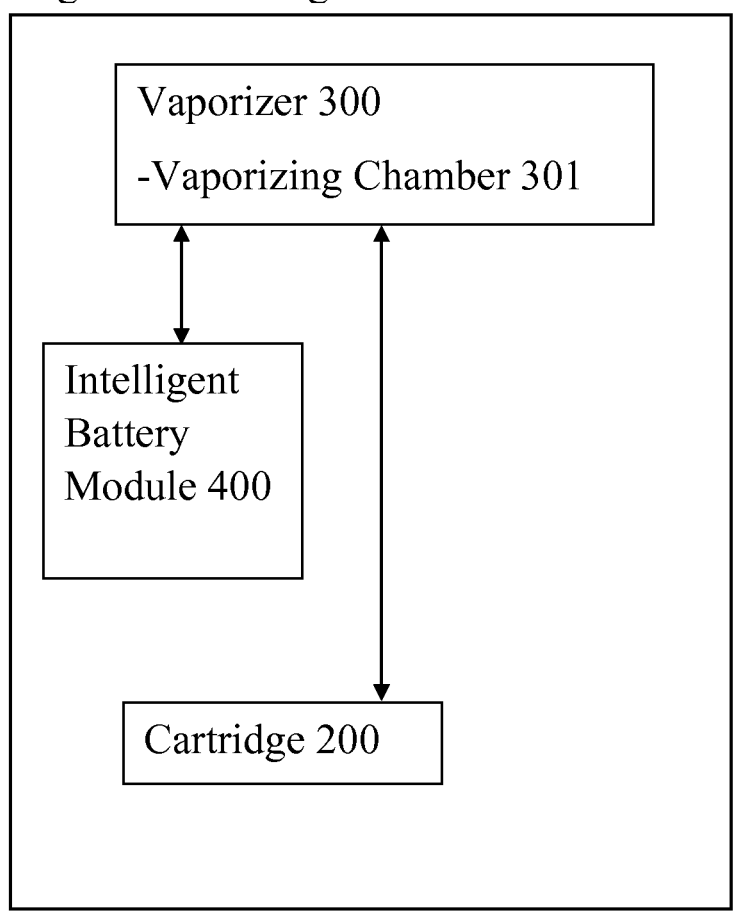
FIG. 1 is a schematic diagram of an electronic cigarette according to a preferred embodiment of the present invention.

The following detailed description of the preferred embodiment is the preferred mode of carrying out the invention. The description is not to be taken in any limiting sense. It is presented for the purpose of illustrating the general principles of the present invention.

Referring to FIG. 1 to FIG. 14, FIG. 15A and FIG. 15B of the drawings, an electronic cigarette 10 according to a preferred embodiment of the present invention is illustrated. Broadly, the electronic cigarette 10 may comprise a cigarette housing 100, a cartridge 200, a vaporizer 300, and an intelligent battery module 400.

The cartridge 200 may be received in the cigarette housing 100 for storing a predetermined amount of liquid solution, such as aerosol and other additives which is to be vaporized and inhaled by a user of the present invention.

The vaporizer 300 may be received in the cigarette housing 100 and may be connected to the cartridge 200. The vaporizer 300 may have a vaporizing chamber 301 and may comprise a heating element 5 in the vaporizing chamber 301 for atomizing the liquid solution transported from the cartridge 200.

The intelligent battery module 400 may comprise a battery casing 401, a battery supporting tray 4, a Printed Circuit Board (PCB 3), a Main Control Unit (MCU 405), a resistance detection circuitry 407, and a temperature control circuitry 408.

The battery casing 401 may have a connecting terminal 101 electrically connected to the vaporizer 300. The battery supporting tray 4 may be received in the battery casing 401.

The Printed Circuit Board (PCB 3) may be supported in the battery casing 401 and may be electrically connected to the battery supporting tray 4. The Main Control Unit (MCU 405) may be implemented on the PCB 3. The resistance detection circuitry 407 may be implemented on the PCB 3 and may be electrically connected to the MCU 405 and the heating element 5 of the vaporizer 300 for detecting a resistance of the heating element 5, in such a manner that when the resistance of the heating element 5 as detected by the resistance detection circuitry 407 reaches a predetermined upper threshold, the MCU 405 is configured to lower or cut off a voltage supplied to the heating element 5 so as to prevent the temperature of the heating element from further increasing. When the resistance of the heating element 5 as detected by the resistance detection circuitry reaches a predetermined lower threshold, the MCU 405 is configured to supply a normal voltage to the heating element 5 of the vaporizer 300.

Figure 15A:
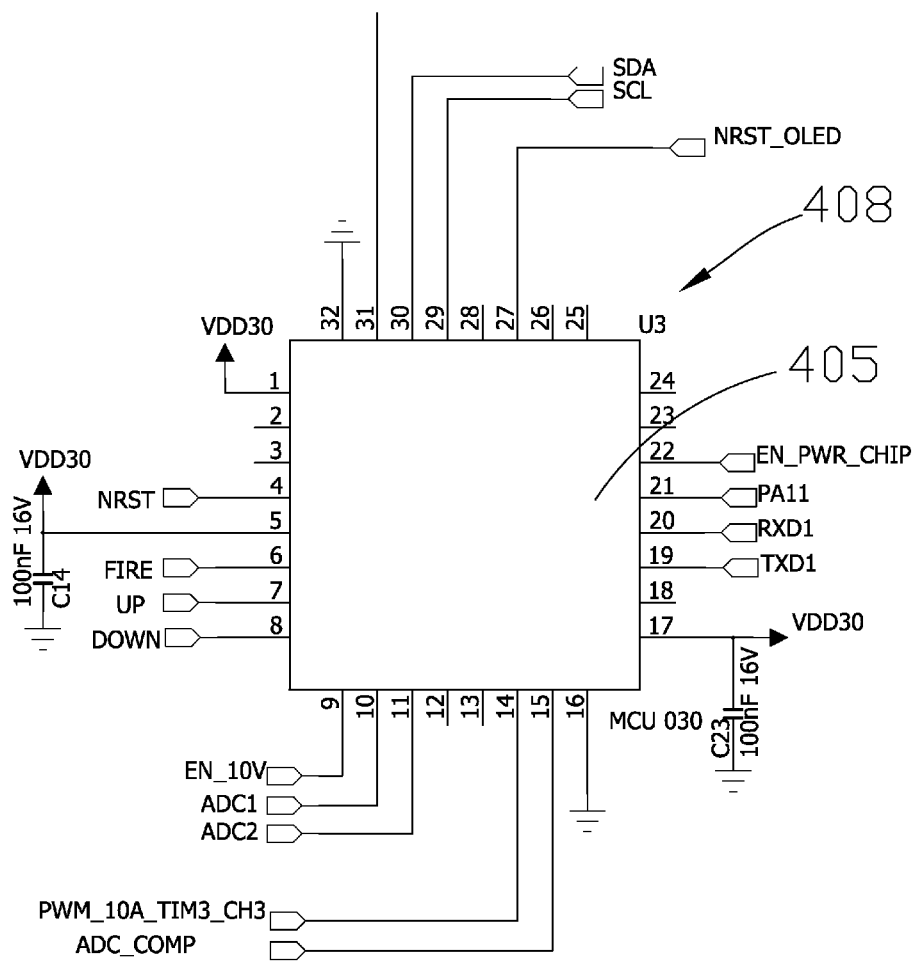
FIG. 15A is a temperature control circuitry and MCU of the intelligent batter module of the electronic cigarette according to the preferred embodiment of the present invention.

The temperature control circuitry 408 may be implemented on the PCB 3 and electrically connected to the MCU 405 through the resistance detection circuitry 407. The temperature control circuitry 408 may comprise a temperature sensor 409 electrically connected to the heating element 5 of the vaporizer 300. The circuit diagram of the temperature control circuitry 408 and MCU 405 is shown in FIG. 15A of the drawings.

According to the preferred embodiment of the present invention, the battery casing 401 of the intelligent battery module 400 may comprise a front casing member 1, a rear casing member 2, and a battery supporting tray 4. The battery casing 401 may have a receiving cavity 4011 formed within the front casing member 1 and the rear casing member 2, wherein the battery supporting tray 4 is supported in the receiving cavity 4011 for supporting at least one battery, such as an AA size battery. Preferably, two batteries are required.

Moreover, the connecting terminal 101 of the battery casing 401 may be provided on a top portion thereof. Thus, the front casing member 1 may have an opening 101A formed on a top surface thereof for supporting the connecting terminal 101. The connecting terminal 101 may comprise a conductive cylinder 1015 supported in the opening 101A, a sealing sleeve 1013 supported within the conductive cylinder 1015, a resilient element 1012 received in the sealing sleeve 1013, and a cathode conductor 1011 supported in the sealing sleeve 1013 so that it is insulated from the conductive cylinder 1015. In this preferred embodiment, a negative terminal of the PCB 3 may be electrically connected to the cathode conductor 1011 through a wire.

The battery supporting tray 4 may be securely connected to the front casing member 1 and may be magnetically and detachably connected to the rear casing member 2. The battery supporting tray 4 may be securely supported in the receiving cavity 4011. When the front casing member 1 and the rear casing member 2 are connected with each other, the receiving cavity 4011 are substantially sealed to form a substantially rectangular cross sectional shape of the battery casing 401. The battery casing 401 may be received and protected in the cigarette housing 100.

Figure 2:
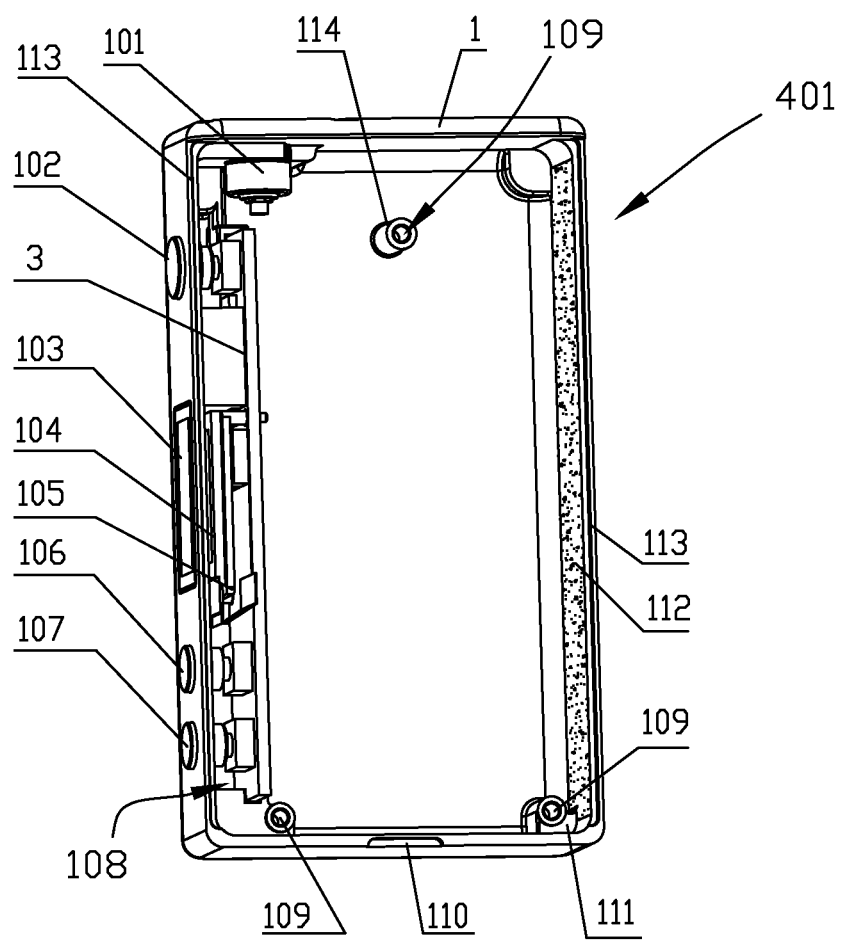
FIG. 2 is a perspective view of an intelligent battery module according to the preferred embodiment of the present invention.
Figure 3:
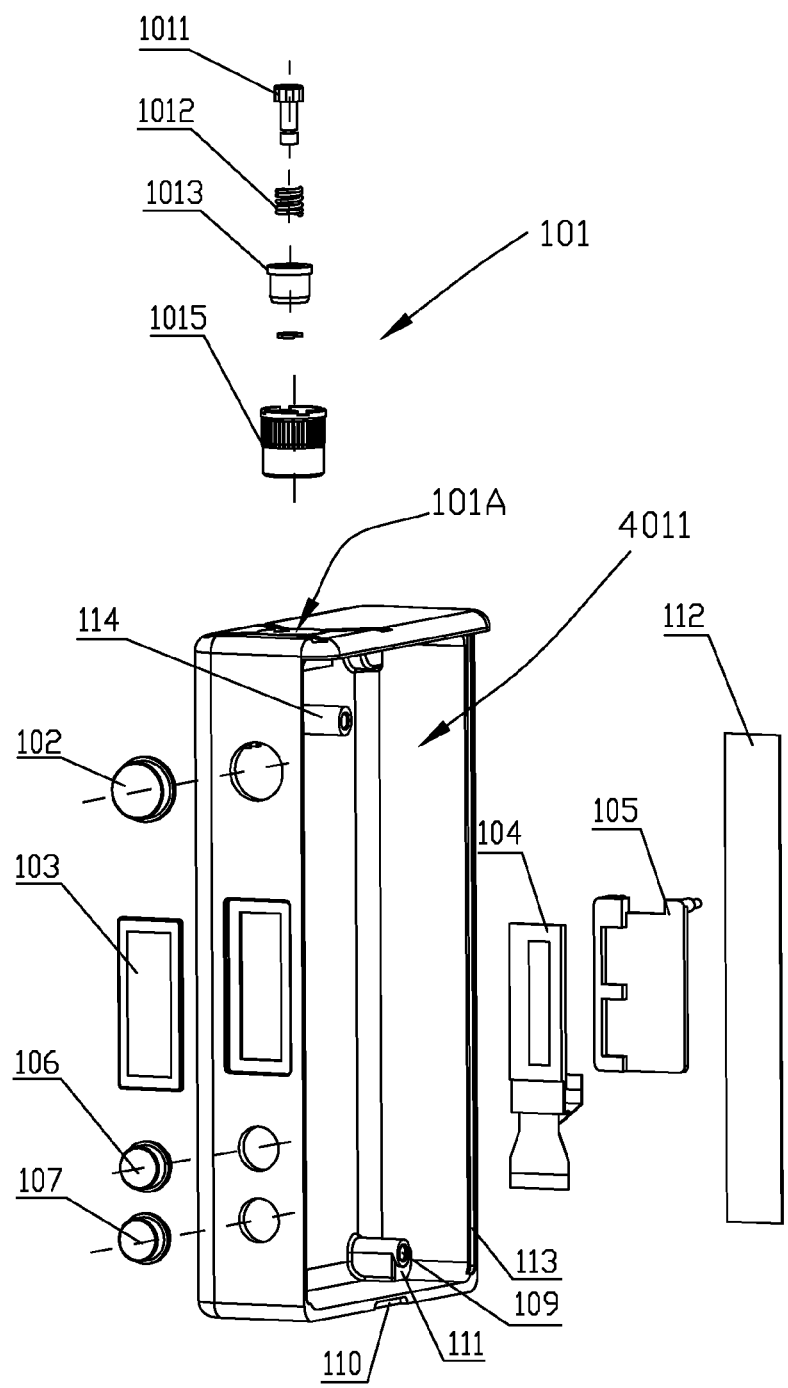
FIG. 3 is an exploded perspective view of a battery casing of the intelligent battery module of the electronic cigarette according to the preferred embodiment of the present invention.

As shown in FIG. 2 of the drawings, the front casing member 1 may further have an installation slot 108 for accommodating the PCB 3. Moreover, the front casing member 1 may further have a connecting member 114 provided on an inner surface of the front casing member 1, and a plurality of tubular protruding members 111 also provided on the inner surface of the front casing member 1. Each of the tubular protruding members 111 may have a threaded portion 109 formed in a corresponding inner circumferential surface. The battery supporting tray 4 may be securely connected to the front casing member 1 through the connecting member 114 and the tubular protruding members 111.

The front casing member 1 may further have an inclined guiding surface 110 inclinedly formed on a bottom portion thereof, in such a manner that when the rear casing member 2 and the front casing member 1 are attached with each other, the inclined guiding surface 110 may expose to an exterior of the battery casing 401. As a result, he inclined guiding surface 110 may guide a user to conveniently detach the rear casing member 2 from the front casing member 1. Furthermore, the front casing member 1 may further comprise a front sticker 112 and a securing slot 113 indently formed on a side edge portion of the front casing member 1.

Figure 4:
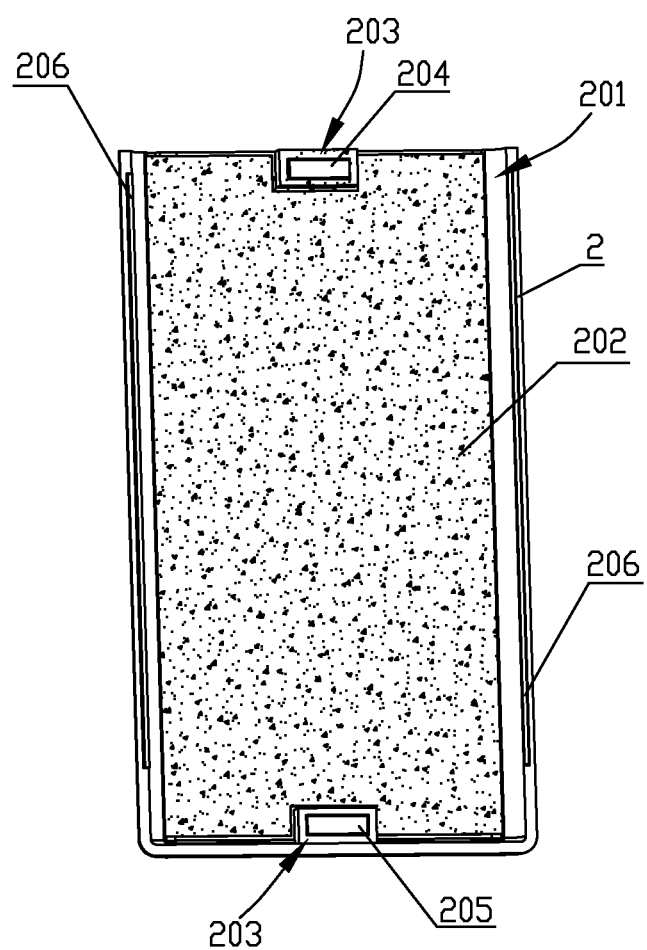
FIG. 4 is a schematic diagram of a rear casing member of the electronic cigarette according to the preferred embodiment of the present invention.
Figure 5:
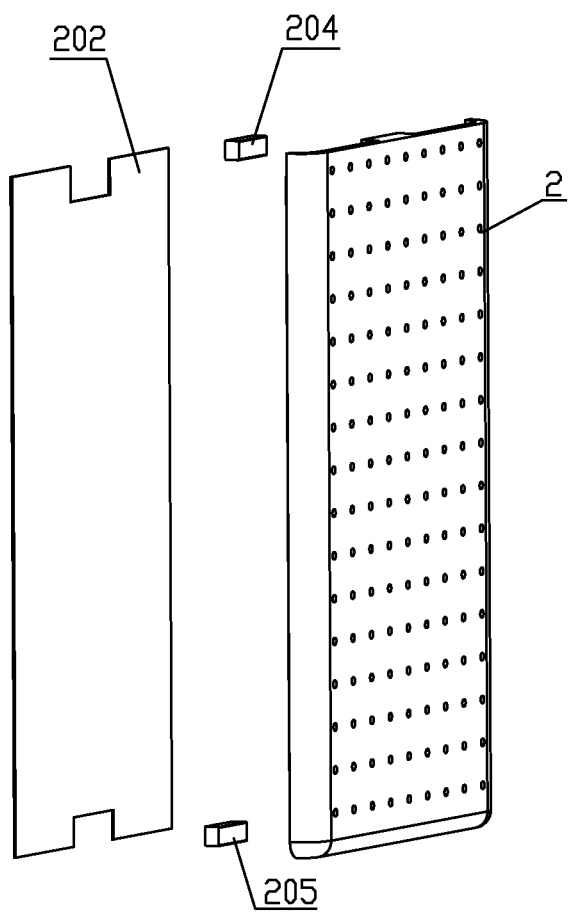
FIG. 5 an exploded perspective view of the rear casing member of the electronic cigarette according to the preferred embodiment of the present invention.
Figure 6:
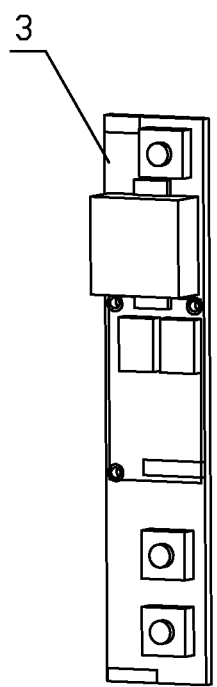
FIG. 6 is a schematic diagram of a PCB of the intelligent battery module of the electronic cigarette according to the preferred embodiment of the present invention.
Figure 7:
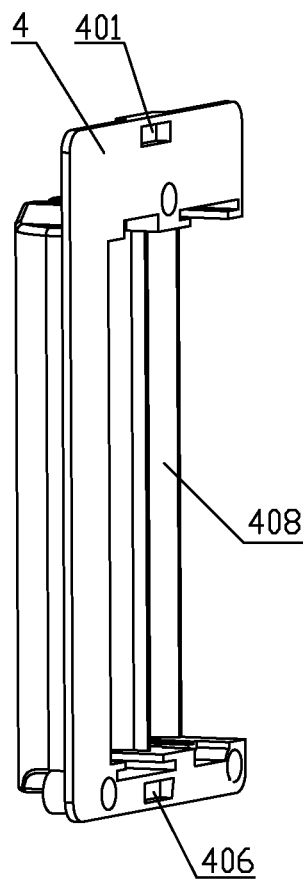
FIG. 7 is a perspective view of a battery supporting tray of the electronic cigarette according to the preferred embodiment of the present invention.

Referring to FIG. 4 to FIG. 5 of the drawings, the rear casing member 2 may have a slightly curved inner surface 201 and two magnetic slots 203 formed on a top portion and a bottom portion of the curved inner surface 201 respectively. The rear casing member 2 may further comprise a rear sticker 202 attached on the curved inner surface 201, and two magnetic members 204, 205 mounted in the two magnetic slots 203 respectively. Moreover, the rear casing member 2 may further comprise a securing member 206 formed on a side edge portion thereof. The securing member 206 is positioned and sized to correspond to the securing slot 113 of the front casing member 1. When the front casing member 1 is magnetically attached to the rear casing member 2, the securing member 206 is arranged to engage with the securing slot 113.

A shown in FIG. 2 of the drawings, the intelligent battery module 400 may further comprise a LCD display screen 104 electrically connected to the PCB 3 and mounted on a LCD installation frame 105 which is provided on the PCB 3. The PCB 3 may be mounted on a side portion of the front casing member 1 so that the LCD display screen 104 may face sidewardly with respect to the battery casing 401. The intelligent battery module 400 may further comprise a transparent lens 103 provided on the front casing member 1 at a position corresponding to the LCD display screen 104. Thus, a user is able to visually observe the LCD display screen 104 through the transparent lens 103.

The intelligent battery module 400 may further comprise a plurality of control buttons 102, 106, 107 spacedly provided on a side surface of the first casing member 1 and electrically connected to the PCB 3. The control buttons 102, 106, 107 may allow a user to control the operation of the electronic cigarette. For example, one control button 102 may be used for turning on or turning off the electronic cigarette.

Figure 10:
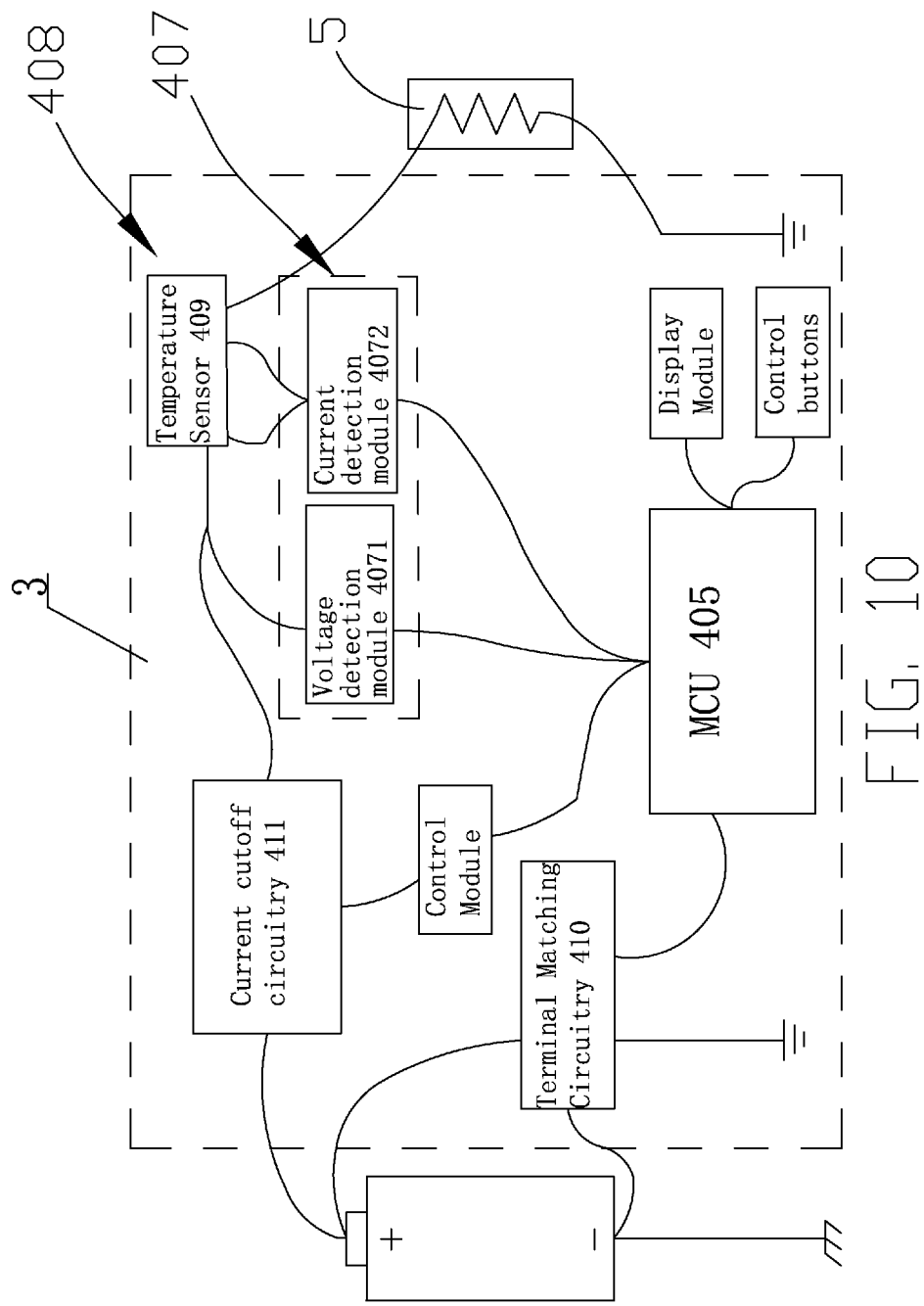
FIG. 10 is a block diagram of various circuitries of the intelligent battery module of the electronic cigarette according the preferred embodiment of the present invention.

Referring to FIG. 10 of the drawings, the temperature sensor 409 may be electrically connected to the heating element 5 of the vaporizer 300 through electrically connecting to the connecting terminal 101.

It is worth pointing out that for a given material, a resistance of the heating element 5 is a function of its temperature. Thus, by measuring the resistance of the heating element 5 at a given time, the temperature of the heating element 5 may be calculated, or vice versa. The temperature may then become the basis for adjusting the power outputted to the vaporizer 300 so as to prevent the vaporizer 300 from generating excessive heat. In this preferred embodiment, detection of the resistance of the heating element 5 may be periodically performed during operation of the electronic cigarette of the present invention. The time may be pre-set at 5 ms. In other words, the resistance detection circuitry 407 is arranged to detect the resistance of the heating element 5 at 5 ms interval.

The MCU 405 may be programmed and configured to achieve different heating effects for the heating element 5. In one mode of operation, which may be customarily referred to as an automatic operating mode, the MCU 405 may be configured such that the maximum power outputted to the vaporizer 300 increases with increasing temperature of the heating element 5. Conversely, the maximum power outputted to the vaporizer 300 decreases with decreasing temperature of the heating element 5.

On the other hand, in another mode of operation, which may be customarily referred to as a joule adjustment mode, the MCU 405 may allow different power outputted to the vaporizer 300 for a given temperature of the heating element 5.

Figure 8:
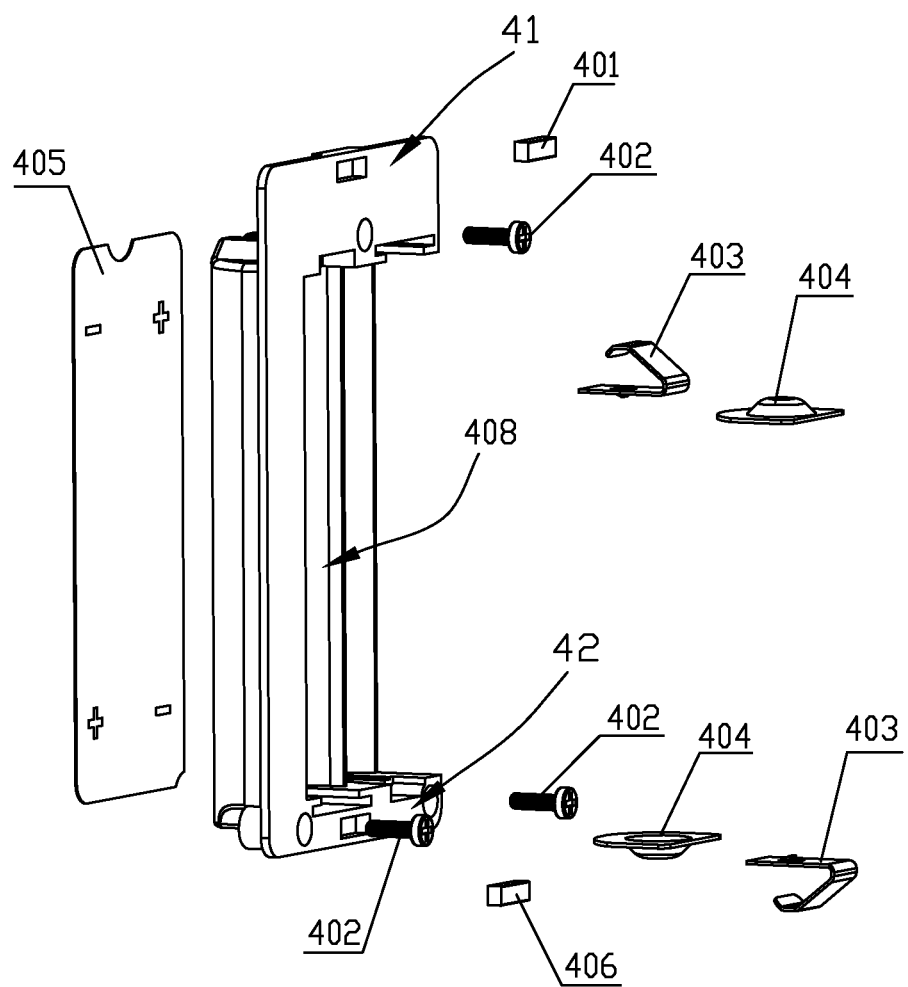
FIG. 8 is an exploded perspective view of a battery supporting tray of the electronic cigarette according to the preferred embodiment of the present invention.
Figure 9:
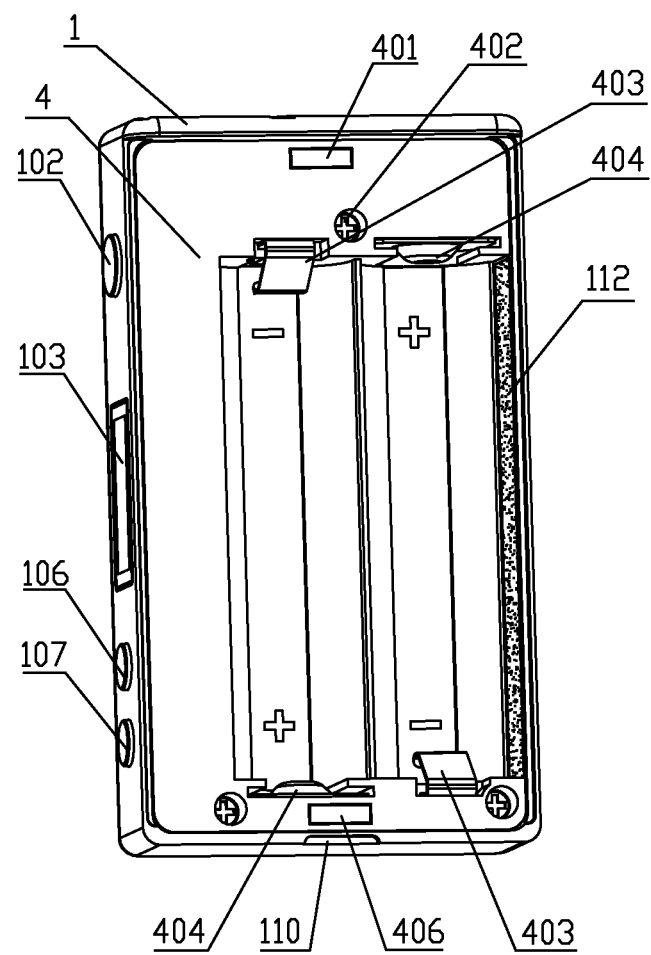
FIG. 9 is a perspective view of the front casing member of the intelligent battery module of the electronic cigarette according to the preferred embodiment of the present invention, illustrating that the battery supporting tray is supported in the front casing member.

Referring to FIG. 8 to FIG. 9 of the drawings, the battery supporting tray 4 may be supported in the first casing member 1, preferably though a screw 402. The battery supporting tray 4 may have a top tray portion 41, a bottom tray portion 42, and two battery compartments 408 formed between the top tray portion 41 and the bottom tray portion 42. The battery supporting tray 4 may further comprise a plurality of magnetic elements 401, 406 provided on the top tray portion 41 and the bottom tray portion 42 respectively. The magnetic elements 401, 406 are positioned corresponding to the position of the magnetic members 204, 205 of the rear casing member 2 respectively. Thus, the rear casing member 2 may be magnetically attached to the front casing member 1 through the magnetic attachment between the magnetic members 204, 205 and the magnetic elements 401, 406. Note that the magnetic members 204, 205 and the magnetic elements 401, 406 may be magnets. Alternatively, the magnetic elements 401, 406 may be magnets and the magnetic members 204, 206 may be metal pieces. Alternatively, the magnetic members 204, 205 may be magnets and the magnetic elements 401, 406 may be metal pieces.

In the preferred embodiment of the present invention, the magnetic members 204, 205 and the magnetic elements 401, 406 are all magnets, and each of the magnetic members 204, 205 is arranged to have opposite polarity. For example, the magnetic members 204, 205 may have an S polarity and N polarity respectively. The corresponding magnetic elements 401, 406 may have an N polarity and S polarity respectively. The reason for such an arrangement is to ensure proper attachment between the front casing member 1 and the rear casing member 2. For example, when the rear casing member 2 is oriented in an upside down manner, the magnetic elements 401, 406 will expel the magnetic members 204, 205 respectively.

The battery supporting tray 4 may further comprise a plurality of positive battery terminals 404, and a plurality of negative battery terminals 403 provided in the battery compartments 408. Each of the battery compartments 408 is provided with one negative battery terminal 403, and one position battery terminal 404 formed at a position opposite to the corresponding negative battery terminal 403. A plurality of batteries may be accommodated in the battery compartments 408 respectively for providing power to the electronic cigarette of the present invention.

Figure 11:
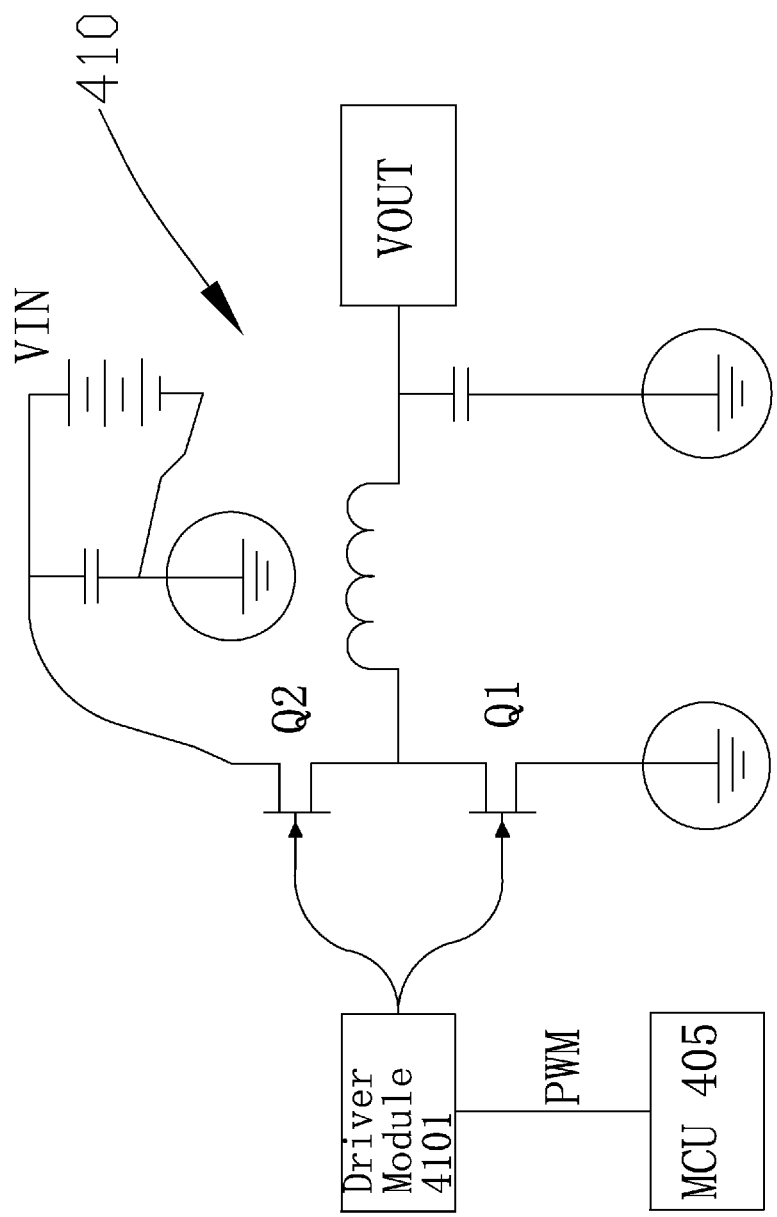
FIG. 11 is a circuit diagram of a terminal matching circuitry of the intelligent battery module of the electronic cigarette according to the preferred embodiment of the present invention.
Figure 12:
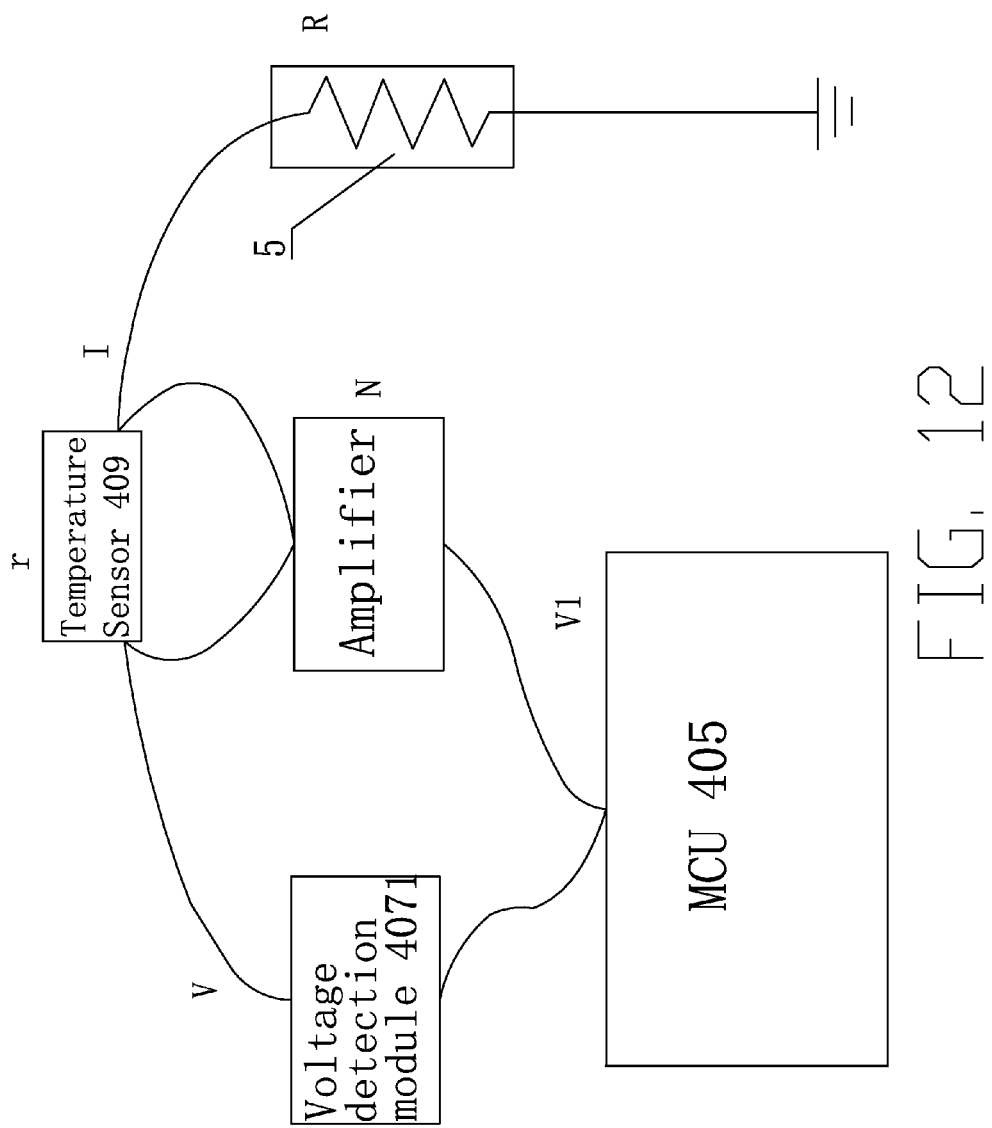
FIG. 12 is a schematic diagram of a temperature control circuitry of the intelligent battery module of the electronic cigarette according to the preferred embodiment of the present invention.
Figure 13:
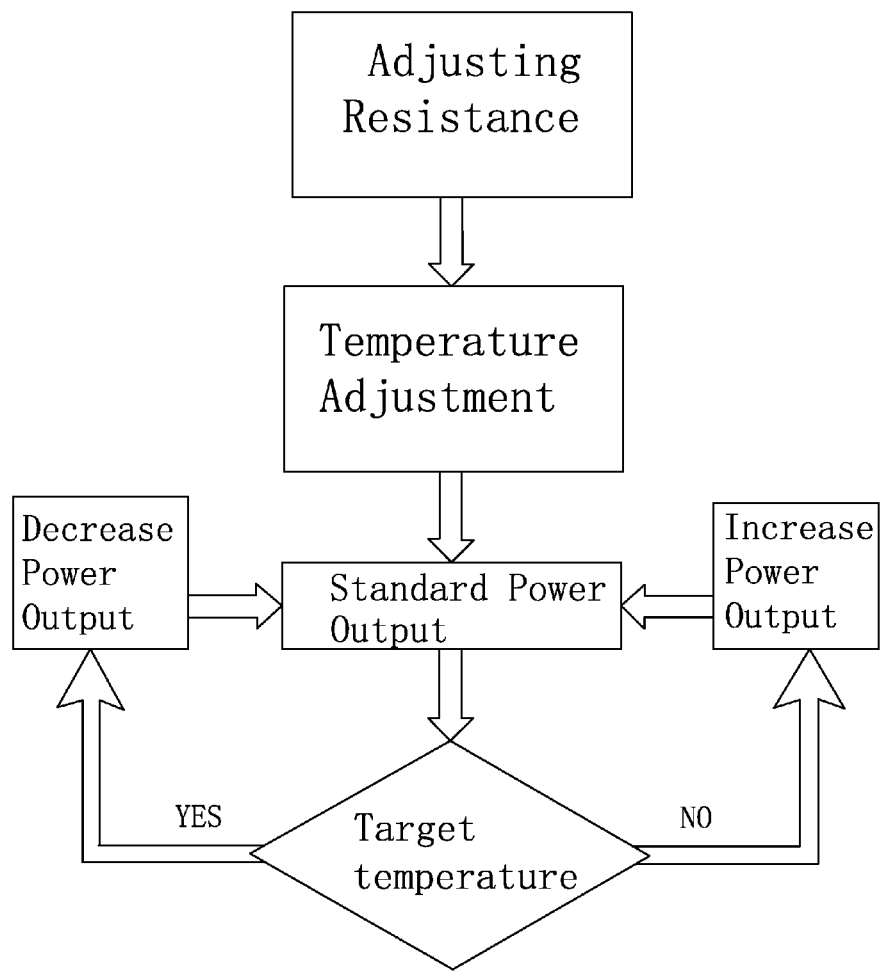
FIG. 13 is a schematic diagram illustrating temperature adjusting of a vaporizer of the electronic cigarette according to the preferred embodiment of the present invention.
Figure 15B:
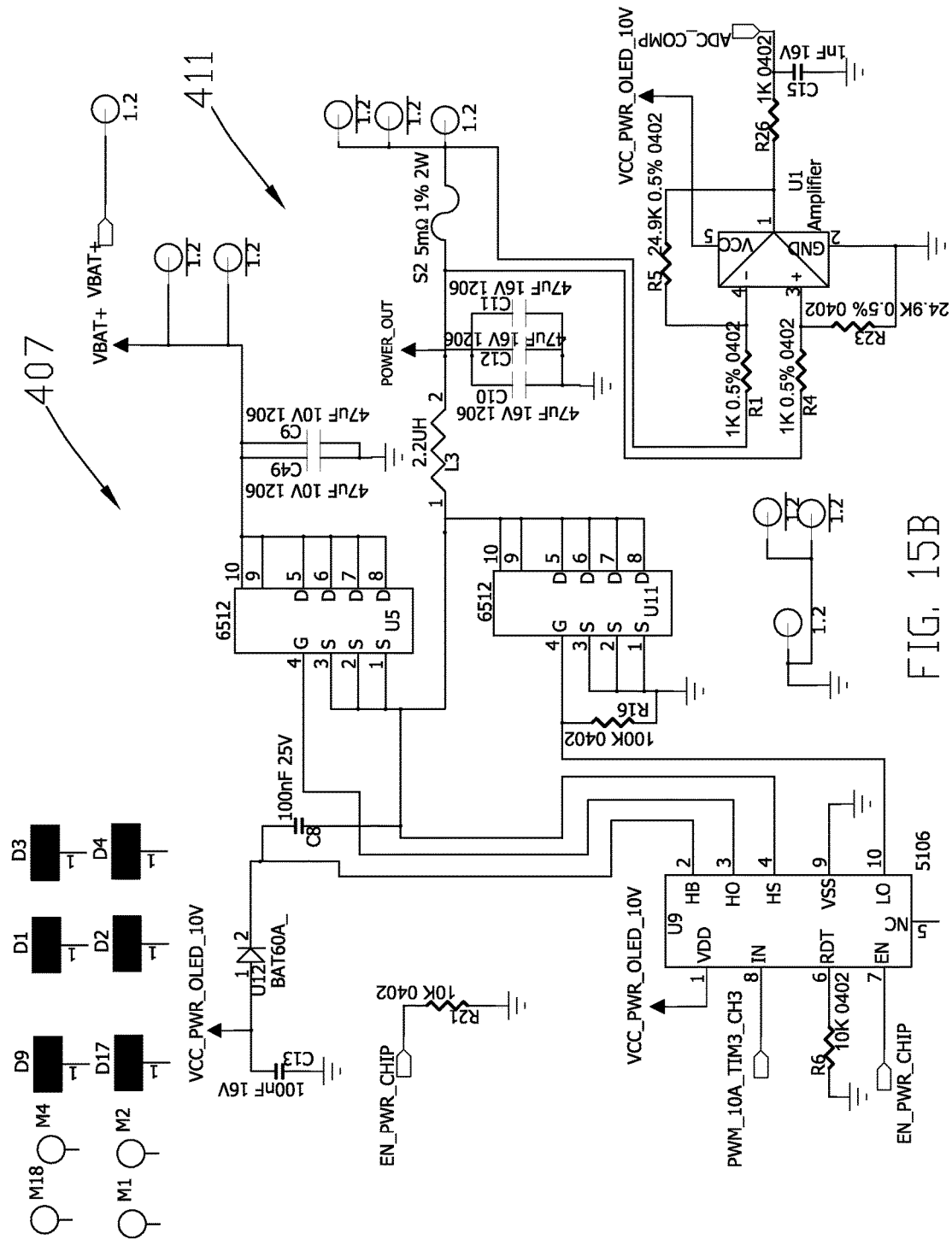
FIG. 15B a terminal matching circuitry of the intelligent batter module of the electronic cigarette according to the preferred embodiment of the present invention.

Referring to FIG. 10 to FIG. 11 of the drawings, the intelligent battery module may further comprise a terminal matching circuitry 410 electrically connected to the battery supporting tray 4 and the MCU 405 for disconnecting electrical connection between the batteries and the MCU 405 when the terminals of the batteries are improperly connected in the battery compartments 408. A circuit diagram of the terminal matching circuitry 410 is illustrated in FIG. 15B of the drawings.

The terminal matching circuitry 410 may comprise two Metal-Oxide-Semiconductor Field Effect Transistor (MOSFET Q1, Q2), a driver module 4101 connected between the MOSFETs Q1, Q2 and the MCU 405. MOSFET Q1 and MOSFET Q2 may be electrically connected together in series. The driver module 4101 may be electrically connected to a Pulse-Width-Modulation (PWM) terminal of the MCU 405, and may be configured to be actuated by the potential difference between a negative terminal and a positive terminal of the batteries. As such, when the batteries are improperly connected, the driver module 4101 will not be actuated and there is no electrical connection between the batteries and the MCU 405. When the MCU 405 is properly connected to the batteries, the MCU 405 may be configured to adjust an output voltage to the vaporizer 300.

The resistance detection circuitry 407 may comprise a voltage detection module 4071 and a current detection module 4072 electrically connected to the MCU 405 and the heating element 5 of the vaporizer 300 for detecting a potential difference (voltage) and current passing though the heating element 5. When the voltage and the current of the heating element 5 is acquired, the resistance of the heating element 5 may also be determined by simple physics theory.

The intelligent battery module 400 may further comprise a current cutoff circuitry 411 electrically connected to MCU 405 for cutting off output current when the output current exceeds a predetermined maximum threshold. In this preferred embodiment, the maximum current threshold may be set at 17 A. The circuit diagram for the resistance detection circuitry and the current cutoff circuitry are illustrated in FIG. 15B of the drawings.

On the other hand, the MCU 405 may be configured to lower voltage output to the heating element 5 of the vaporizer 300 when the voltage output of the batteries falls below a minimum voltage threshold. This prevents the batteries from generating too much heat when the vaporizer 300 is operating. The MCU 405 may be also configured to limit the maximum possible voltage outputted to the heating element 5 of the vaporizer 300 for preventing damage to the vaporizer 300 and the intelligent battery module 400, or other components of the electronic cigarette.

Figure 14:
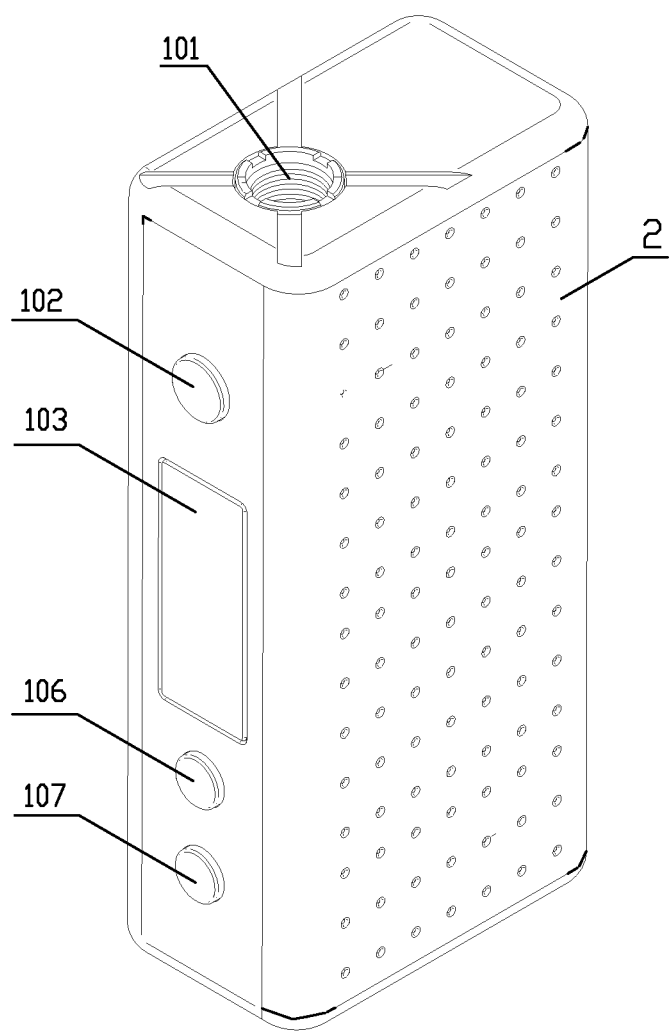
FIG. 14 is a perspective view of the intelligent battery module of the electronic cigarette according to the preferred embodiment of the present invention.

FIG. 14 illustrates a combined perspective view of the intelligent battery module 400. The front casing member 1 and the rear casing member 2 is attached together while the entire intelligent battery module 400 is accommodated in the cigarette housing 100.

The present invention, while illustrated and described in terms of a preferred embodiment and several alternatives, is not limited to the particular description contained in this specification. Additional alternative or equivalent components could also be used to practice the present invention.

What is claimed is:

1. An electronic cigarette, comprising:
  a cigarette housing;
  a cartridge received in said cigarette housing for storing a predetermined amount of liquid solution;
  a vaporizer received in said cigarette housing and connected to said cartridge, said vaporizer having a vaporizing chamber and comprising a heating element in said vaporizing chamber for atomizing said liquid solution; and
  an intelligent battery module, which comprises:
  a battery casing having a connecting terminal electrically connected to said vaporizer;
  a battery supporting tray received in said battery casing for accommodating at least one battery;
  a Printed Circuit Board (PCB) supported in said battery casing and is electrically connected to said battery supporting tray;
  a Main Control Unit (MCU) implemented on said PCB;
  a resistance detection circuitry implemented on said PCB and is electrically connected to said MCU and said heating element of said vaporizer for detecting a resistance of said heating element, in such a manner that when said resistance of said heating element as detected by said resistance detection circuitry reaches a predetermined upper threshold, said MCU is configured to lower or cut off a voltage supplied to said heating element so as to prevent said temperature of said heating element from further increasing, wherein when said resistance of said heating element as detected by said resistance detection circuitry reaches a predetermined lower threshold, said MCU is configured to supply a normal voltage to said heating element of said vaporizer; and
  a temperature sensor electrically connected to said MCU and said heating element of said vaporizer so as to detect a temperature of said heating element,
  wherein said resistance detection circuitry comprise a voltage monitoring module and a current monitoring module electrically connected to said temperature sensor and said MCU for detecting a voltage and a current of said heating element respectively,
  wherein said intelligent battery module further comprises a terminal matching circuitry electrically connected to said battery supporting tray and said MCU for disconnecting electrical connection between said batteries and said MCU when said terminals of said batteries are improperly connected in said battery compartments, said terminal matching circuitry comprising two Metal-Oxide-Semiconductor Field Effect Transistor (MOSFETs), and a driver module connected between said MOSFETs and said MCU, said MOSFETs being electrically connected together in series, said driver module being electrically connected to a Pulse-Width-Modulation terminal of said MCU, and being configured to be actuated by a potential difference between a negative terminal and a positive terminal of said batteries.

2. The electronic cigarette battery, as recited in claim 1, wherein said resistance detection circuitry may further comprises a voltage detection module and a current detection module electrically connected to said MCU and said heating element of said vaporizer for detecting a potential difference and a current passing though said heating element.

3. The electronic cigarette battery, as recited in claim 2, wherein said intelligent battery module further comprises a current cutoff circuitry electrically connected to MCU for cutting off output current when said output current exceeds a predetermined maximum threshold.

4. The electronic cigarette battery, as recited in claim 3, wherein said MCU is configured to lower voltage output to said heating element of said vaporizer when said voltage output of said batteries falls below a minimum voltage threshold.

5. An intelligent battery module for an electronic cigarette having a vaporizer which has a heating element, said intelligent battery module comprising:
  a battery casing having a connecting terminal electrically connected to said vaporizer;

a battery supporting tray received in said battery casing for accommodating at least one battery;

a Printed Circuit Board (PCB) supported in said battery casing and is electrically connected to said battery supporting tray;

a Main Control Unit (MCU) implemented on said PCB;

a resistance detection circuitry implemented on said PCB and is electrically connected to said MCU and said heating element of said vaporizer for detecting a resistance of said heating element, in such a manner that when said resistance of said heating element as detected by said resistance detection circuitry reaches a predetermined upper threshold, said MCU is configured to lower or cut off a voltage supplied to said heating element so as to prevent said temperature of said heating element from further increasing, wherein when said resistance of said heating element as detected by said resistance detection circuitry reaches a predetermined lower threshold, said MCU is configured to supply a normal voltage to said heating element of said vaporizer; and a temperature sensor electrically connected to said MCU and said heating element of said vaporizer so as to detect a temperature of said heating element, wherein said resistance detection circuitry comprise a voltage monitoring module and a current monitoring module electrically connected to said temperature sensor and said MCU for detecting a voltage and a current of said heating element respectively, wherein said intelligent battery module further comprises a terminal matching circuitry electrically connected to said battery supporting tray and said MCU for disconnecting electrical connection between said batteries and said MCU when said terminals of said batteries are improperly connected in said battery compartments, said terminal matching circuitry comprising two Metal-Oxide-Semiconductor Field Effect Transistor (MOSFETs), and a driver module connected between said MOSFETs and said MCU, said MOSFETs being electrically connected together in series, said driver module being electrically connected to a Pulse-Width-Modulation terminal of said MCU, and being configured to be actuated by a potential difference between a negative terminal and a positive terminal of said batteries.

6. The intelligent battery module, as recited in claim 5, wherein said resistance detection circuitry further comprises a voltage detection module and a current detection module electrically connected to said MCU and said heating element of said vaporizer for detecting a potential difference and a current passing though said heating element.

7. The intelligent battery module, as recited in claim 6, wherein said intelligent battery module further comprises a current cutoff circuitry electrically connected to MCU for cutting off output current when said output current exceeds a predetermined maximum threshold.

8. The intelligent battery module, as recited in claim 7, wherein said MCU is configured to lower voltage output to said heating element of said vaporizer when said voltage output of said batteries falls below a minimum voltage threshold.

* * * * *